United States Patent
Mitsui et al.

(10) Patent No.: US 10,442,715 B2
(45) Date of Patent: Oct. 15, 2019

(54) CHROMIUM-CONTAINING WATER TREATMENT METHOD

(71) Applicant: SUMITOMO METAL MINING CO., LTD., Tokyo (JP)

(72) Inventors: Hiroyuki Mitsui, Tokyo (JP); Osamu Nakai, Tokyo (JP); Keisuke Shibayama, Tokyo (JP); Sho Shirai, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 135 days.

(21) Appl. No.: 15/542,485

(22) PCT Filed: Sep. 15, 2015

(86) PCT No.: PCT/JP2015/076199
§ 371 (c)(1),
(2) Date: Jul. 10, 2017

(87) PCT Pub. No.: WO2016/113946
PCT Pub. Date: Jul. 21, 2016

(65) Prior Publication Data
US 2018/0273411 A1    Sep. 27, 2018

(30) Foreign Application Priority Data

Jan. 13, 2015 (JP) ................. 2015-004374

(51) Int. Cl.
*C02F 9/00* (2006.01)
*C02F 1/70* (2006.01)
(Continued)

(52) U.S. Cl.
CPC .............. *C02F 9/00* (2013.01); *C02F 1/66* (2013.01); *C02F 1/70* (2013.01); *C22B 3/44* (2013.01);
(Continued)

(58) Field of Classification Search
CPC ........................................................ C02F 9/00
See application file for complete search history.

(56) References Cited

U.S. PATENT DOCUMENTS

| | | |
|---|---|---|
| 3,901,805 A | 8/1975 | Stewart |
| 4,260,491 A | 4/1981 | Cassidy et al. |

(Continued)

FOREIGN PATENT DOCUMENTS

| | | |
|---|---|---|
| EP | 2412681 A1 | 2/2012 |
| GB | 1143473 A | 2/1969 |

(Continued)

OTHER PUBLICATIONS

International Preliminary Examination Report dated May 16, 2017, issued to PCT Application No. PCT/P2015/076199.
(Continued)

*Primary Examiner* — Peter Keyworth
(74) *Attorney, Agent, or Firm* — Locke Lord LLP; James E. Armstrong, IV; Nicholas J. DiCeglie, Jr.

(57) ABSTRACT

The present invention provides a chromium-containing water treatment method that allows treatment of water that contains chromium (chromium-containing water) at low cost. A chromium-containing water treatment method according to the present invention comprises: a reduction step in which chromium-containing water 11 and a liquid 12 containing 5-50 ppm of hydrogen sulfide are mixed, and the mixture is adjusted to pH 3.5 or lower and ORP 200-400 mV by adding an acid 13 thereto, so as to reduce chromium contained in the water; and a precipitation separation step in which a neutralizing agent is added to a solution 11' obtained via the reduction step so as to adjust the solution 11' to pH 8-9, thereby precipitating and separating, as a hydroxide, the reduced chromium contained in the solution.

5 Claims, 1 Drawing Sheet

(51) Int. Cl.
  *C22B 3/44* (2006.01)
  *C02F 1/66* (2006.01)
  *C02F 1/52* (2006.01)
  *C02F 101/22* (2006.01)

(52) U.S. Cl.
  CPC ........ *C02F 1/5236* (2013.01); *C02F 2101/22* (2013.01)

(56) References Cited

U.S. PATENT DOCUMENTS

| | | | |
|---|---|---|---|
| 4,684,472 A | 8/1987 | Abbe et al. | |
| 2003/0192832 A1 | 10/2003 | Bowers | |
| 2016/0047014 A1 | 2/2016 | Ozaki et al. | |

FOREIGN PATENT DOCUMENTS

| | | |
|---|---|---|
| JP | 48-036962 A | 5/1973 |
| JP | 51-006195 A | 1/1976 |
| JP | 51-113357 A | 10/1976 |
| JP | 63-001497 A | 1/1988 |
| JP | 06-169977 A | 6/1994 |
| JP | 07-080478 A | 3/1995 |
| JP | 2001-259355 A | 9/2001 |
| JP | 2004-209424 A | 7/2004 |
| JP | 2005-095783 A | 4/2005 |
| JP | 2005-161116 | 6/2005 |
| JP | 2005-342694 A | 12/2005 |
| JP | 2006-281651 A | 10/2006 |
| JP | 2010-022926 A | 2/2010 |
| JP | 2010-227737 A | 10/2010 |
| JP | 2014-218719 A | 11/2014 |

OTHER PUBLICATIONS

Examination Report dated Apr. 27, 2018, issued to AU Patent Application No. 2015377617.
Extended European Search Report dated May 25, 2018, issued to EP Patent Application No. 15877898.5.
International Search Report dated Dec. 15, 2015, issued for PCT/JP2015/076199.

CHROMIUM-CONTAINING WATER TREATMENT METHOD

TECHNICAL FIELD

The present invention relates to a method of treating water containing chromium.

BACKGROUND ART

In order to discharge water containing a metal element out of factories and the like, it is required to remove the residual metal element by some kinds of methods. As a method of removing the metal element from water, there are a coagulating sedimentation method, an ion exchange method, an adsorption method to adsorb the metal element on an adsorbent such as activated carbon, an electrical adsorption method, a magnetic adsorption method, and the like, but a coagulating sedimentation method using a neutralizing agent is frequently used as a general method.

Specifically, as a coagulating sedimentation method, a method is employed in which the metal is solidified as a hydroxide by adding a neutralizing agent to the water to be treated to raise the pH, the solid is then separated from the liquid by an operation such as filtration, the liquid is discharged out of the factory, and the solid is treated at a waste disposal site or the like. An inexpensive calcium-based neutralizing agent such as limestone or slaked lime is generally used as the neutralizing agent to be used in the coagulating sedimentation method.

However, when treating water containing chromium (Cr) as a metal element, it is not possible to sufficiently efficiently and effectively separate chromium by the coagulating sedimentation method described above in some cases.

Specifically, in order to effectively immobilize chromium as a hydroxide, it is required to react chromium after once being reduced from hexavalent chromium to trivalent chromium and thus to conduct the reduction treatment by using a reducing agent, but the use of a reducing agent results in a cost increase.

For such a reason, there is a demand for a method of inexpensively treating water containing chromium.

For example, Patent Document 1 discloses a method of treating chromium-containing wastewater which includes a reduction step of reducing hexavalent chromium to trivalent chromium by adding a ferrous ion to the water containing hexavalent chromium, an insolubilization step of converting the trivalent chromium produced in the reduction step to an insoluble hydroxide by adding an alkali to the effluent from the reduction step, and a sludge separation step of separating the insoluble hydroxide from the effluent from the insolubilization step and in which a part of the sludge separated in the sludge separation step is introduced into the reduction step.

However, according to the technique described in Patent Document 1, it is required to prepare a reducing agent in order to reduce hexavalent chromium to trivalent chromium, and this results in expensive treatment cost.

Patent Document 1: Japanese Unexamined Patent Application, Publication No. H07-80478

DISCLOSURE OF THE INVENTION

Problems to be Solved by the Invention

The present invention has been proposed in view of the above circumstances, and an object thereof is to provide a chromium-containing water treatment method that allows treatment of water containing chromium (chromium-containing water) at low cost.

Means for Solving the Problems

The present inventors have conducted intensive investigations to achieve the above-mentioned object. As a result, it has been found out that water containing chromium can be effectively treated at low cost by reducing chromium contained in water to be treated with hydrogen sulfide, which has a low concentration and is discharged from the processes of various factories, plants, and the like, whereby the present invention has been completed. In other words, the present invention provides the following ones.

(1) A first aspect of the present invention is a chromium-containing water treatment method including a reduction step of reducing chromium contained in water by mixing the water containing chromium and a liquid containing hydrogen sulfide at 5 ppm to 50 ppm and adding an acid to a mixed solution to adjust a pH to 3.5 or less and an ORP to 200 mV to 400 mV, and a precipitation and separation step of precipitating reduced chromium contained in a solution obtained through the reduction step as a hydroxide by adding a neutralizing agent to the solution to adjust a pH to 8 to 9 and separating a precipitate of the hydroxide.

(2) A second aspect of the present invention is the chromium-containing water treatment method according to the first aspect, in which the acid is sulfuric acid.

(3) A third aspect of the present invention is the chromium-containing water treatment method according to the first aspect or the second aspect, in which the neutralizing agent is at least one or more of calcium oxide, calcium carbonate, and calcium hydroxide.

(4) A fourth aspect of the present invention is the chromium-containing water treatment method according to any one of the first to third aspects, in which a trivalent iron compound is allowed to coexist in a mixed solution of the water containing chromium with the liquid containing hydrogen sulfide in the reduction step.

(5) A fifth aspect of the present invention is the chromium-containing water treatment method according to the fourth aspect, in which the trivalent iron compound is iron hydroxide.

Effects of the Invention

According to the present invention, it is possible to effectively treat water containing chromium at low cost.

BRIEF DESCRIPTION OF THE DRAWINGS

FIG. 1 is a schematic diagram which illustrates an example of a reaction vessel for executing a chromium-containing water treatment method.

PREFERRED MODE FOR CARRYING OUT THE INVENTION

Hereinafter, specific embodiments of the present invention (hereinafter referred to as the "present embodiments") will be described in detail with reference to the drawings. Incidentally, the present invention is not limited to the following embodiments, and various modifications can be made without changing the gist of the present invention.

The method of treating water containing chromium according to the present embodiment (hereinafter, also referred to as "chromium-containing water") includes a reduction step of reducing chromium contained in water and a precipitation and separation step of producing a hydroxide precipitate of chromium by adding a neutralizing agent to the solution obtained through the reduction step and separating the hydroxide precipitate.

<Reduction Step>

Chromium contained in water to be treated is reduced in the reduction step. More specifically, in this reduction step, chromium in water is reduced by mixing the chromium-containing water and a liquid containing hydrogen sulfide at 5 ppm to 50 ppm, and adding an acid to the mixed solution to adjust the pH to 3.5 or less and the oxidation-reduction potential (ORP) to 200 mV to 400 mV.

Figure 1A:
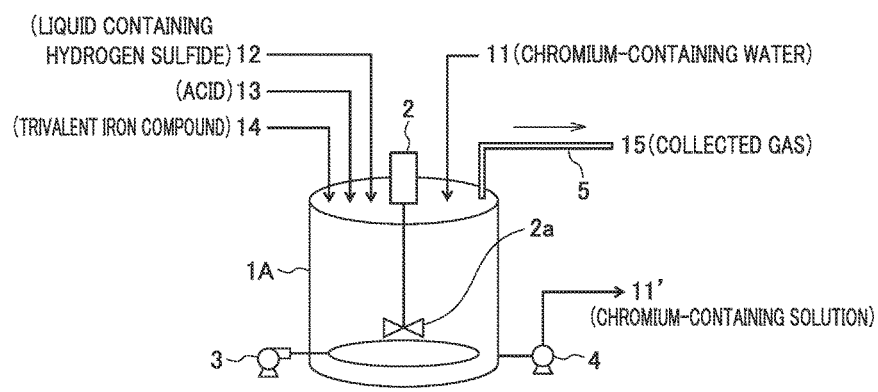
FIG. 1A is a schematic diagram of a reaction vessel for conducting a treatment in a reduction step and FIG. 1B is a schematic diagram of a reaction vessel for conducting a treatment in a precipitation and separation step.

FIG. 1 is a schematic diagram which illustrates an example of the reaction vessel for executing the chromium-containing water treatment method. First, in the reduction step, as illustrated in FIG. 1A, chromium-containing water 11 to be treated and a liquid 12 containing hydrogen sulfide at 5 ppm to 50 ppm are charged into a reaction vessel 1A having a desired capacity and mixed together to reduce hexavalent chromium contained in the chromium-containing water 11 to trivalent chromium.

Incidentally, it is preferable to conduct the reduction treatment in the reduction step while stirring, for example, by installing a stirring device 2 having a stirring blade 2a in the reaction vessel 1A. In addition, as illustrated in FIG. 1A, for example, the mixed solution may be stirred by an air blower 3 to enhance the reaction efficiency.

In the chromium-containing water treatment method according to the present embodiment, the liquid 12 containing hydrogen sulfide at a concentration of 5 ppm to 50 ppm is used in order to reduce chromium contained in the chromium-containing water 11 in the reduction step as described above.

When reducing chromium, preparing and using a general reducing agent causes high treatment costs. Meanwhile, hydrogen sulfide at a low concentration is discharged from the processes of various factories, plants, and the like in some cases. The present inventors have investigated whether hydrogen sulfide discharged from such factories and the like can be utilized in the reduction treatment of chromium or not. As a result, it has been found out that it is possible to efficiently and effectively reduce chromium contained in water to be treated at low cost by using a liquid which is process water from factories, plants, and the like and contains hydrogen sulfide at a concentration range of 5 ppm to 50 ppm.

As described above, in the chromium-containing water treatment method according to the present embodiment, chromium is reduced by using the liquid 12 which is discharged from processes from factories, plants, and the like and which contains hydrogen sulfide at a predetermined concentration, namely, process water, and this makes it possible to conduct the reduction treatment at low cost without preparing a new reducing agent.

In addition, the liquid (process water) 12 containing hydrogen sulfide at a concentration of 5 ppm to 50 ppm cannot be used in a use application such as a sulfurizing agent, since it has a low hydrogen sulfide concentration. From this reason, it has been hitherto required to subject the process water discharged from factories and the like to a detoxification treatment immobilizing the hydrogen sulfide as sulfur. However, the detoxification treatment also involves costs. In contrast, in the present embodiment, since the process water 12 is used for reducing chromium in the treatment of the chromium-containing water 11, it is also not required to conduct the detoxification treatment of the process water as in the related art and it is possible to effectively cut down the costs required for the treatment.

With regard to the concentration of hydrogen sulfide, the reduction reaction cannot sufficiently proceed when the concentration thereof is less than 5 ppm since the concentration is too low. On the other hand, there is a possibility of hydrogen sulfide being used in a main use application such as a sulfurizing agent when the concentration of hydrogen sulfide exceeds 50 ppm.

In addition, when a gas containing hydrogen sulfide is used instead of a liquid, it cannot be sufficiently effectively mixed when being mixed with the chromium-containing water 11 in the reaction vessel 1A, and the reduction efficiency decreases. Hence, the liquid 12 containing hydrogen sulfide at 5 ppm to 50 ppm is used to be mixed with chromium-containing water 11. Incidentally, a liquid adjusted by blowing a gas containing hydrogen sulfide into a liquid so as to have a hydrogen sulfide concentration of 5 ppm to 50 ppm may be used.

In the reduction step, the pH of the mixed solution of the chromium-containing water 11 with the liquid 12 containing hydrogen sulfide is adjusted to 3.5 or less and the ORP thereof is adjusted to 200 mV to 400 mV to cause the reduction reaction.

The pH of the mixed solution is adjusted by adding an acid 13 as illustrated in FIG. 1A. Specifically, the acid is not particularly limited, and for example, sulfuric acid, hydrochloric acid, nitric acid, and the like can be used, and in particular, sulfuric acid is preferably used. Sulfuric acid is generally used in various factories and plants and can be easily used without making a new investment in storage facilities and the like.

With regard to the pH of the mixed solution, the reduction reaction cannot efficiently proceed when the pH exceeds 3.5. For this reason, the reduction treatment is conducted by adding an acid to the mixed solution to adjust the pH to 3.5 or less, and the pH is more preferably adjusted to 3.0 or less. Incidentally, the upper limit of pH is not particularly limited, but it is preferably 1.0 or more from the viewpoint of adjusting the amount of acid used to be in an appropriate range.

The ORP of the mixed solution is adjusted by increasing or decreasing the amount of chromium-containing water 11 and the amount of hydrogen sulfide (amount of liquid 12 containing hydrogen sulfide) that are added and mixed in the reaction vessel.

With regard to the ORP of the mixed solution, a great amount of hydrogen sulfide is required when the ORP is less than 200 mV, and it is thus difficult to conduct efficient treatment. On the other hand, reduced chromium will be oxidized when the ORP exceeds 400 mV. For this reason, the reduction treatment is conducted by adjusting the ORP to 200 mV to 400 mV, and the ORP is more preferably adjusted to 250 mV to 350 mV.

Here, in the reduction step, it is preferable to add a trivalent iron compound 14 to coexist in the mixed solution when mixing the chromium-containing water 11 with the liquid 12 containing hydrogen sulfide at 5 ppm to 50 ppm. In a case in which the chromium-containing water 11 and the liquid 12 containing hydrogen sulfide at 5 ppm to 50 ppm are mixed together in the single reaction vessel 1A, the amount of hydrogen sulfide contained in the liquid 12 containing hydrogen sulfide is greater than the amount of hydrogen sulfide required for the reduction of chromium in some cases. Particularly, in the present embodiment, the amount of hydrogen sulfide contained in the process water 12 is substantially greater than the amount of hydrogen sulfide required for the reduction of chromium by using the liquid 12 containing hydrogen sulfide at 5 ppm to 50 ppm of the process water discharged from factories, plants, and the like in the reduction treatment of chromium as described above. In such a case, it is possible to effectively detoxify excessive hydrogen sulfide in the mixed solution in the reaction vessel 1A by allowing the trivalent iron compound 14 to coexist in the mixed solution.

The trivalent iron compound 14 is not particularly limited, but it is preferably iron hydroxide ($Fe(OH)_3$). For example, in a case in which water to be treated contains iron, it is possible to easily obtain iron hydroxide as a precipitate to be obtained after the coagulating sedimentation treatment in the present embodiment and thus to treat the chromium-containing water 11 at even lower cost.

The amount of the trivalent iron compound 14 added is not particularly limited, and an excessive amount can be added. In addition, the timing of addition is also not particularly limited, and the trivalent iron compound 14 can be added, for example, after the reduction reaction is performed by adding the chromium-containing water 11 and the liquid 12 containing hydrogen sulfide.

After the treatment in the reduction step is completed, the solution (chromium-containing solution) 11' obtained by the reduction treatment is recovered and transferred to the reaction vessel 1B in which the treatment in the precipitation and separation step of the next step is conducted by using a delivery pump 4. In addition, a gas (collected gas) 15 generated by the reduction reaction is recovered as it passes through a collecting line 5 connected to a scrubber.

<Precipitation and Separation Step>

In the precipitation and separation step, a hydroxide precipitate of chromium is produced by adding a neutralizing agent to the solution obtained through the reduction step and separated. More specifically, in this precipitation and separation step, reduced chromium is coagulated and precipitated as a hydroxide by adding a neutralizing agent to the solution after the reduction treatment to adjust the pH to 8 to 9, and the precipitate thus produced is separated.

Figure 1B:
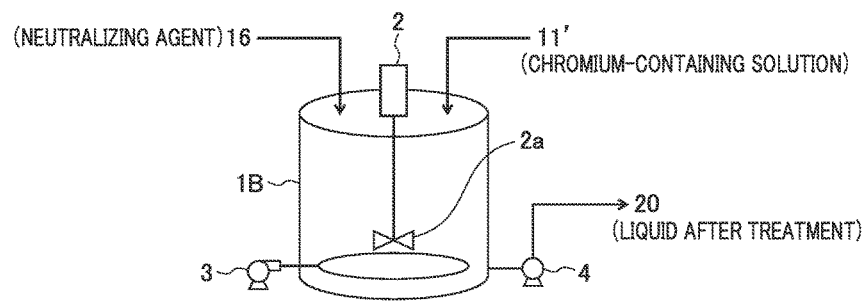

FIG. 1B is a schematic diagram which illustrates an example of the reaction vessel for conducting the treatment in the precipitation and separation step. As illustrated in FIG. 1B, in the precipitation and separation step, the chromium-containing solution 11' transferred from the reaction vessel 1A used for the treatment in the reduction step is charged into the reaction vessel 1B having a desired capacity, and the pH of the solution is adjusted to 8 to 9 by adding a neutralizing agent 16 to the chromium-containing solution 11'. By this, reduced chromium in the solution is coagulated as a hydroxide to form a precipitate, and a liquid after treatment 20 from which chromium has been removed can be obtained.

Incidentally, in the schematic diagram of FIG. 1B, the same apparatus configuration as that in FIG. 1A will be described with the same reference numerals. In the treatment in this precipitation and separation step as well, it is preferable to conduct the treatment while stirring, for example, by installing the stirring device 2 having the stirring blade 2a in the reaction vessel 1B. In addition, as illustrated in FIG. 1B, for example, the solution may be stirred by the air blower 3 to enhance the reaction efficiency.

The neutralizing agent 16 is not particularly limited, but it is preferably one or more kinds of calcium oxide, calcium carbonate, or calcium hydroxide. These neutralizing agents 16 are particularly preferable from the viewpoint of being inexpensive and easily available.

With regard to the pH of the solution, chromium hydroxide is not effectively produced in some cases when the pH is less than 8. On the other hand, it is not preferable that the pH exceeds 9 since the amount of the neutralizing agent 16 to be added increases.

After the treatment in the precipitation and separation step is completed, the hydroxide precipitate of chromium is separated from the solution (liquid after treatment) 20 from which chromium has been removed by a solid-liquid separation operation, and only the liquid after the treatment 20 is recovered. Incidentally, the liquid after the treatment 20 can be recovered, for example, by using the delivery pump 4.

EXAMPLES

Hereinafter, the present invention will be more specifically described with reference to Examples and Comparative Examples, but the present invention is not at all limited to the following Examples.

Example 1

First, as a reduction step, water containing chromium at a concentration of 0.39 mg/L and a liquid containing hydrogen sulfide at a concentration of 5 ppm were charged into a reaction vessel at 250 $m^3$/hr and 10 $m^3$/hr, respectively, and mixed together, and the mixed solution was subjected to the reduction treatment by adjusting the pH thereof to 2.71 by addition of sulfuric acid as well as adjusting the ORP thereof to 200 mV to 400 mV. Incidentally, iron hydroxide as a trivalent iron compound was simultaneously added to the mixed solution.

Next, as a precipitation and separation step, calcium carbonate and calcium hydroxide as a neutralizing agent were added to the solution obtained by the reduction treatment to adjust the pH to 8.5, and reduced chromium was thus separated as a precipitate of the hydroxide.

The chromium-containing water was treated by such a method, and as a result, it was possible to effectively decrease chromium as the chromium concentration in the water was changed from 0.39 mg/L to 0.02 mg/L.

Example 2

Chromium-containing water was treated in the same manner as in Example 1 except that a liquid containing hydrogen sulfide at a concentration of 50 ppm was mixed.

As a result, it was possible to effectively decrease chromium as the chromium concentration in the water was changed from 0.39 mg/L to 0.01 mg/L.

Comparative Example 1

Calcium carbonate and calcium hydroxide as a neutralizing agent were added to water having a flow rate of 250 $m^3$/hr and a chromium concentration of 0.39 mg/L to adjust the pH to 8.5, and chromium in the water was precipitated and separated as a hydroxide.

The concentration of chromium in the water obtained by such a treatment method, namely, a treatment only by the addition of a neutralizing agent was 0.38 mg/L, and the concentration was thus slightly decreased.

EXPLANATION OF REFERENCE NUMERALS 1A and 1B Reaction vessel
2 Stirring device
11 Chromium-containing water
11' Chromium-containing solution
12 Liquid containing hydrogen sulfide (process water)
13 Acid
14 Trivalent iron compound
15 Collected gas
16 Neutralizing agent
20 Liquid after treatment

The invention claimed is:

1. A chromium-containing water treatment method comprising:

a reduction step of reducing the chromium contained in water with hydrogen sulfide contained in a process water by mixing the water containing chromium and the process water containing hydrogen sulfide at 5 ppm to 50 ppm and adding an acid to a mixed solution to adjust a pH to 3.5 or less and an ORP to 200 mV to 400 mV; and a precipitation and separation step of precipitating reduced chromium contained in a solution obtained through the reduction step as a hydroxide by adding a neutralizing agent to the solution to adjust a pH to 8 to 9 and separating a precipitate of the hydroxide.

2. The chromium-containing water treatment method according to claim 1, wherein the acid is sulfuric acid.

3. The chromium-containing water treatment method according to claim 1, wherein the neutralizing agent is at least one or more of calcium oxide, calcium carbonate, and calcium hydroxide.

4. The chromium-containing water treatment method according to claim 1, wherein a trivalent iron compound is allowed to coexist in the mixed solution of the water containing chromium with the process water containing hydrogen sulfide in the reduction step.

5. The chromium-containing water treatment method according to claim 4, wherein the trivalent iron compound is iron hydroxide.

* * * * *